Oct. 17, 1939.  C. L. WHITEFORD  2,176,283
PROJECTION SLIDE MOUNTING
Filed June 30, 1937
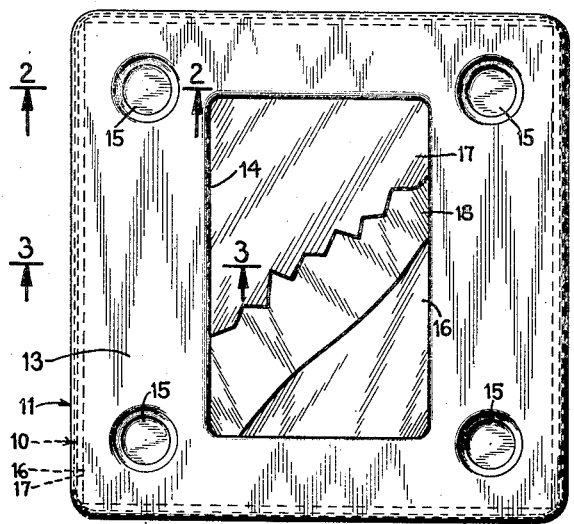
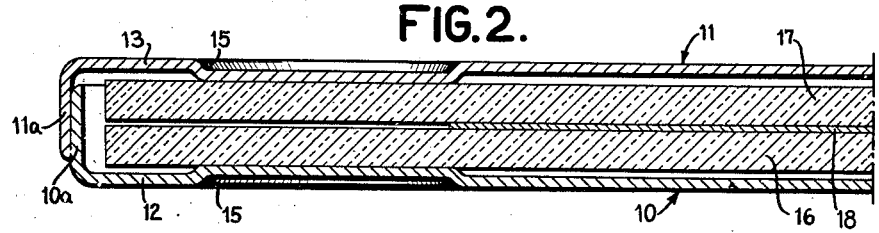
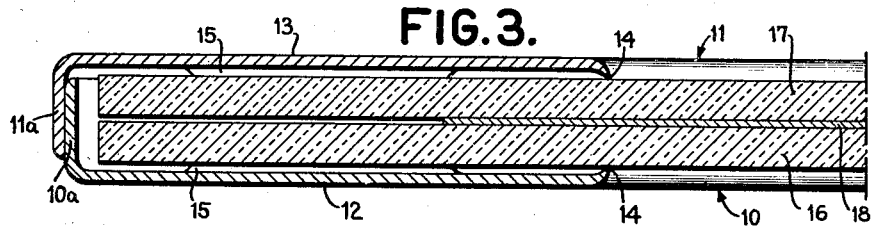
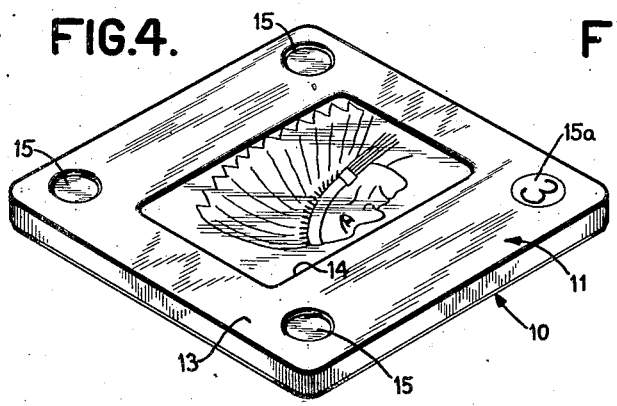
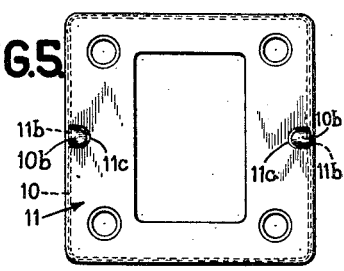
INVENTOR
Carlton L. Whiteford
BY
Cooper, Kerr & Dunham
ATTORNEYS Patented Oct. 17, 1939

2,176,283

UNITED STATES PATENT OFFICE 2,176,283

PROJECTION SLIDE MOUNTING

Carlton L. Whiteford, Brooklyn, N. Y.

Application June 30, 1937, Serial No. 151,137

7 Claims. (Cl. 88—26)

This invention relates to improvements in slides for projecting purposes and relates more particularly to the provision of a simple slide assembly and mounting means for mounting a photographic film for projection.

With the present developments of colored photography the practice has grown of mounting photographic films upon slides and displaying the same by projection. Projection slides for this purpose now in common use adopt the well known features of passe partout picture mounting. Such slides are commonly now made by taking a pair of glass plates, placing the film between mats or frames which are disposed upon each side of the film and then placing the mats between the glass plates and securing the glass plates together. The mats frame the picture upon projection and center it with respect to the outside of the glass. Care must be taken, of course, to properly center the film with respect to the mats. After such slide components are correctly assembled and aligned, which is a time consuming procedure, the slide assemblage is kept in assembled relation by applying gum tape to the edges to secure the glass plates together with the film and mats between the glass plates. The mats which are used with such slides are usually made of paper and the frame edge of the mats frequently has slightly ragged edges which on projection are greatly magnified and present an objectionable appearance.

A further objection to such slides now in use is that the film is not disposed in intermediate juxtaposition to the glass plates, but it is spaced from each plate by the thickness of the mat. This permits slight buckling of the film, which is objectionable during projection because the desired sharp focus cannot be maintained.

The present invention has for its objects, the provision of improved mounting means whereby the above difficulties may be largely, if not wholly, obviated.

A further object of the present invention resides in the provision of an improved film and slide mounting means which will provide for the mounting and assembling of slides without the use of mats, the mounting means serving to both secure the glass plates in assembled relation with the film therebetween and to frame the picture properly upon projection without the projection of fuzzy edges at the frame margin.

A further object of the present invention resides in the provision of an improved mounting means for slides wherein the film may be placed in direct contact with each glass plate and maintained flat and prevented from buckling, thereby improving projection.

A further object of the present invention resides in the provision of slide mountings which will provide for the securing of glass plates and film in assembled relation, by mechanical means which will obviate the necessity of the use of gummed tape border material or the like.

A further object of the present invention resides in the provision of a slide mounting which is cheap, relatively inexpensive to manufacture and easy to assemble, even by the most inexperienced person.

A further object of the present invention resides in the provision of a slide mounting means of the character described having means provided thereon for the reception of indicia adapted to designate the front with respect to the back of the slide and the top with respect to the bottom of the slide and the number of the slide in order that projection may be facilitated.

Further and other objects of the present invention will be hereinafter set forth in the accompanying specification and claims and shown in the drawing which shows by way of illustration a preferred embodiment and the principle thereof and what I now consider to be the best mode in which I have contemplated of applying that principle. Other embodiments of the invention employing the same or equivalent principle may be used and structural changes made as desired by those skilled in the art without departing from the present invention and within the spirit of the appended claims.

In the drawing:

Figure 1 is a top plan view of the complete slide mounting with the parts in assembled relation therein; the glass is shown broken away to show the film.

Fig. 2 is a partial sectional view, the section being taken on line 2—2 of Fig. 1 and looking in the direction of the arrows;

Fig. 3 is another detailed sectional view, the section being taken substantially on line 3—3 of Fig. 1;

Fig. 4 is a perspective view of the completed slide; and

Fig. 5 shows a modification with tabs to secure the cups together.

In more detail in the drawing, the slide-mounting preferably comprises a pair of cup-shaped members 10 and 11. Member 10 is provided with an annular edge portion 10a and member 11 is provided with an annular edge portion 11a. These edge portions 10a and 11a are adapted to telescope together as shown in Figs. 2 and 3. The material from which the members 10 and 11 is made is of suitable resilient material such as sheet aluminum. However, the use of metallic material is not essential since other materials such as plastic moldings could be used. Both of the members 10 and 11 are provided with flange portion 12 and 13, which flange portions of each member terminate at their inner edges in a turn in edge portions 14. The members 10 and 11 may also be provided at the corners of the flange portions with one or more cup-like depressions 15. Such cup-like depressions may be used to receive a slide identifying marking, one of which is shown at 15a in Fig. 4. The applied marking 15a serves to not only indicate the number of the slide, but it also serves to locate the top right hand corner of the slide to facilitate placing the slide in proper position in the projecting machine.

Referring now to Figs. 2 and 3, 16 and 17 represent a pair of glass plates and 18 represents the film which is disposed between the plates. In making up a slide, the general practice would be to place the lower glass plate 16 into the inner cup member 10, the cup member at its rounded corners will substantially centralize the glass plate therein. As shown in Fig. 1, the glass plate at its corner abuts the rounded inner corner of the cup 10, thereafter the film 18 will be placed upon the lower plate 16.

In practice it may be convenient to have a source of light under the slide to facilitate inspection of the film, so that the film 18 can be centralized properly with respect to the framing marginal edge 14 of the lower cup. If desired, after the film is centralized it may be secured in position with respect to the lower glass plate by adhesive cement applied at the edges of the film or through the customary sprocket apertures if such are in the film.

The glass plate 17 is now placed in position over the top of the film. This plate is likewise substantially centralized in the lower cup. The final operation is to place the top member 11 in position, the same telescoping at its annular edges 11a over the annular edges 10a of the lower cup. Friction between the annular edges 10a and 11a serves to hold the parts in assembled relation. With the parts in such assembled relation it will be observed that the parts 14 come into surface contact with the glass plates and tend to clamp the plates together and keep them in tight contact with the film. One or more of the depressed portions 15 also may contact with the glass plates and aid in clamping them together. These depressed portions 15 also serve to provide a reinforcement and stiffening for the corners of the cup members.

In use the edge portions 14 afford a framing for the picture upon projection. It will be noted that while the framing edge 14 is not in sharp focus because the plane of focus is at the plane of the film 18, the edge portions 14 will afford a definite framing line free from any irregularities which would result in fuzzy marginal edges upon projection. The projected picture will have a pleasing appearance with a slightly shadowy frame line. Such frame line will not however have the fuzzy effect which is produced with paper mats which are now in use.

The slide mounting described has other incidental advantages when in use. The exterior dimensions of all slides are uniform and this improves projection with the projecting machines now in use. Each slide will assume the same position in the projecting machine as every other slide and which will obviate the necessity of refocusing the projecting machine from slide to slide.

The finished slide has slightly rounded corners which is desirable from a point of ease of handling.

The slide mounting described provides a mechanical means for holding the glass plate in assembled position with a film therebetween and obviously obviates the use of material such as gum tape for binding the marginal edges. The matter of assembling of the slides is considerably expedited over practices now in use and slides can be neatly mounted by the most inexperienced person in a minimum of time. The film is maintained in direct contact with the glass on each side of the film and buckling prevented. Further no paper mats are required and the difficulties of cleaning the edges of such mats and removing paper fragments is obviated.

If desired one of the cup members, for example the inner one may be provided with one or more tabs extending up from the top edge to 10a and projecting through slots in the top telescoping cup. Such tabs would then be bent over preferably into a recess provided in the top cup. This construction would provide a means of positively locking the cups together. In Fig. 5, 10b indicates the tabs which project through slots 11b in part 11 and which fold down into recesses or depressions 11c in the top of 11.

What I claim is:

1. A slide mounting structure comprising an assemblable pair of cup-shaped members and a pair of glass plates, which plates receive and align a film therebetween, said cup-shaped members comprising telescoping edge portions and cutaway portions affording picture openings, said members when assembled enclosing and holding said plates whereby the film is maintained in aligned position for projection through the picture openings of the members, at least one of the cup-shaped members having depressions between its inner and outer edge for receiving identifying means for the picture, the depressed portions of the last mentioned cup-shaped member providing face-engaging abutments for engaging the adjacent face of the adjacent glass plate.

2. A slide mounting structure comprising an assemblable pair of cup-shaped members and a pair of glass plates, which plates receive and align a film therebetween, said cup-shaped members having telescoping edge portions and cutaway portions affording picture openings, said members when assembled enclosing and holding said plates whereby the film is maintained in aligned position for projection through the picture openings of the member, both of said cup-shaped members having flange portions adjacent the picture openings turned inwardly toward the glass plates to clamp the plates and afford a clean cut framing edge.

3. A slide mounting structure comprising an assemblable pair of cup-shaped members and a pair of glass plates, which plates receive and align a film therebetween, said cup-shaped members having telescoping edge portions and cutaway portions affording picture openings, said members when assembled enclosing and holding said plates whereby the film is maintained in aligned position for projection through the picture openings of the members, at least one of said members having its inner edge flanged and turned inward toward the adjacent glass plate to abut the glass plate with a line contact and afford a clean cut framing edge for the picture upon projection.

4. A slide mounting structure comprising an assemblable pair of cup-shaped members and a pair of glass plates, which plates receive and align a film therebetween, said cup-shaped members having telescoping edge portions and cutaway portions affording picture openings, said members when assembled enclosing and holding said plates whereby the film is maintained in aligned position for projection through the picture openings of the members, both of said members between the outer edges and picture openings having a plurality of depressed areas to abut the surface of the glass plates for the purpose described.

5. A slide mounting structure comprising an assemblable pair of cup-shaped members and a pair of glass plates, which plates receive and align a film therebetween, said cup-shaped members having telescoping edge portions and cutaway portions affording picture openings, said members when assembled enclosing and holding said plates whereby the film is maintained in aligned position for projection through the picture openings of the members, one of said members having deformable portions to engage in depressed portions of the other cup-shaped member to positively hold the inner cup in assembled relation with respect to the outer cup and to maintain clamping pressure on the glass plates when the parts are assembled.

6. A slide mounting structure comprising a pair of cup-shaped members having telescopic edge portions and aligned central picture framing openings, a pair of glass plates enclosed by said cup-shaped members for holding, supporting and aligning a film therebetween, said cup-shaped members having depressed areas on the side portions thereof positioned between the rim portions and the central picture opening to receive identifying means or the like and affording face-engaging abutments with the glass faces whereby the film is positioned before the picture opening for projection upon a screen.

7. A slide mounting structure comprising a pair of glass plates for receiving a film therebetween, a pair of cup-shaped members having flange and telescoping edge portions for enclosing and housing the outer edges and faces of the glass plates and for securing the assemblage together with the film between the plates, said members each having centrally apertured portions affording a picture projecting opening, the inner of said cup-shaped members having portions for marginally engaging both glass plates and for preventing substantial shift of both glass plates in all directions and preventing film disalignment, both of said members having portions depressed inward from the outer surfaces into contact with the faces of the glass plates for applying localized clamping pressure thereto.

CARLTON L. WHITEFORD.